United States Patent
Okada et al.

(10) Patent No.: US 12,459,562 B2
(45) Date of Patent: Nov. 4, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Kotaro Okada, Kashiba (JP); Kazuki Itazuri, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/507,640

(22) Filed: Nov. 13, 2023

(65) Prior Publication Data

US 2024/0158004 A1 May 16, 2024

(30) Foreign Application Priority Data

Nov. 16, 2022 (JP) ................................. 2022-183604

(51) Int. Cl.
*B62D 6/00* (2006.01)
*B62D 5/04* (2006.01)

(52) U.S. Cl.
CPC ............... *B62D 6/002* (2013.01); *B62D 5/04* (2013.01)

(58) Field of Classification Search
CPC .......... B62D 6/002; B62D 5/04; B62D 6/008; B62D 15/025; B62D 5/0463; B62D 6/00
See application file for complete search history.

(56) References Cited

U.S. PATENT DOCUMENTS

| | | | | |
|---|---|---|---|---|
| 6,386,587 B1* | 5/2002 | Hebenstreit | ............ | B62D 1/184 |
| | | | | 280/775 |
| 10,807,634 B2* | 10/2020 | Lee | ...................... | B62D 5/0481 |
| 12,240,448 B2* | 3/2025 | Handa | ................... | B60W 40/02 |
| 2006/0047391 A1* | 3/2006 | Katou | ................... | B62D 6/008 |
| | | | | 180/443 |

(Continued)

FOREIGN PATENT DOCUMENTS

| | | |
|---|---|---|
| JP | 2002-331947 A | 11/2002 |
| JP | 2020-111215 A | 7/2020 |
| JP | 2022-068056 A | 5/2022 |

OTHER PUBLICATIONS

May 13, 2024 Search Report issued in European Patent Application No. 23209435.9.

*Primary Examiner* — Kurt Philip Liethen
(74) *Attorney, Agent, or Firm* — Oliff PLC (57) ABSTRACT

A steering control device controls a steering device. The steering device includes a steering shaft, a turning wheel of a vehicle, the turning wheel turning due to rotation of the steering shaft, and a motor rotating the steering shaft. The steering control device includes a processor that executes a traveling environment information acquisition process and a look-ahead compensation process. In the traveling environment information acquisition process, the processor acquires information relevant to a traveling environment of the vehicle. In the look-ahead compensation process, the processor preliminarily rotates the steering shaft depending on a play compensation amount relevant to a predetermined turn direction. The processor determines an appropriate turn direction for the vehicle, as the predetermined turn direction, from the information relevant to the traveling environment.

6 Claims, 8 Drawing Sheets

(56) References Cited

U.S. PATENT DOCUMENTS

| | | | |
|---|---|---|---|
| 2008/0142293 A1* | 6/2008 | Goto | B62D 6/003 |
| | | | 701/42 |
| 2011/0257845 A1* | 10/2011 | Niki | B62D 5/0472 |
| | | | 701/41 |
| 2017/0066476 A1* | 3/2017 | Kudo | B62D 5/0463 |
| 2017/0088167 A1* | 3/2017 | Fujii | B62D 1/286 |
| 2019/0039640 A1* | 2/2019 | Nishimura | B62D 6/10 |
| 2019/0084579 A1 | 3/2019 | Maura | |
| 2019/0367079 A1* | 12/2019 | Kodera | B62D 6/002 |
| 2023/0023426 A1* | 1/2023 | Hamaguchi | B62D 15/025 |
| 2023/0347970 A1* | 11/2023 | Saigo | B62D 5/0463 |

* cited by examiner

STEERING CONTROL DEVICE

CROSS-REFERENCE TO RELATED APPLICATION

This application claims priority to Japanese Patent Application No. 2022-183604 filed on Nov. 16, 2022, incorporated herein by reference in its entirety.

BACKGROUND

1. Technical Field

The present disclosure relates to a steering control device.

2. Description of Related Art

For example, Japanese Unexamined Patent Application Publication No. 2022-68056 describes a control device that corrects a target steering angle depending on a steering direction. In this device, when a planned steering direction is a right steering direction, the target steering angle is corrected by a play amount that is a value corresponding to the right steering direction. The play amount is the maximum of an amount in which a turning angle of a turning wheel does not change even when a steering angle changes.

In the near future, steering may not necessarily be performed in the same manner as steering at present. For quickly responding to the steering in the near future, there is a concern that the above device may not necessarily be sufficient.

SUMMARY

Embodiments of the present disclosure and function effects of the embodiments will be described below.

1. A steering control device is configured to control a steering device. The steering device includes a steering shaft, a turning wheel of a vehicle, the turning wheel turning due to rotation of the steering shaft, and a motor rotating the steering shaft. The steering control device includes a processor. The processor is configured to execute a traveling environment information acquisition process and a look-ahead compensation process. In the traveling environment information acquisition process, the processor acquires information relevant to a traveling environment of the vehicle. In the look-ahead compensation process, the processor preliminarily rotates the steering shaft depending on a play compensation amount relevant to a predetermined turn direction. The processor determines an appropriate turn direction for the vehicle, as the predetermined turn direction, from the information relevant to the traveling environment.

In the above configuration, since the look-ahead compensation process is executed, it is possible to preliminarily rotate the steering shaft in a direction that is appropriate as a direction in which the vehicle turns. Therefore, it is possible to quickly alter the turning angle, when the steering in the predetermined turn direction is actually performed.

2. The processor of the steering control device according to the item 1 may be configured to execute a play displacement calculation process in which the processor calculates a play displacement whenever a steering angle changes. The steering angle is a rotation angle of the steering shaft. The play displacement identifies a position in a region where a turning angle of the turning wheel does not change despite change in the steering angle. The play compensation amount relevant to the predetermined turn direction allows the play displacement to be maintained within the region.

In the above configuration, the value that allows the play displacement to be maintained at a value within the region where the turning angle does not change despite change in the steering angle is adopted as the play compensation amount. Thereby, it is possible to restrain the steering from being unintentionally performed by the look-ahead compensation process.

3. In the steering control device according to the item 2, the play compensation amount relevant to the predetermined turn direction may allow the play displacement to be set to an end portion of the region in the predetermined turn direction.

In the above configuration, by the look-ahead compensation process, the play displacement is set to the value of the end portion of the above region. Thereby, it is possible to quickly perform the turning of the turning wheel, when the steering in the predetermined turn direction is actually performed.

4. In the traveling environment information acquisition process, the processor of the steering control device according to any one of the items 1 to 3 may acquire information relevant to a turn direction of a lane at a predetermined spot located forward of the vehicle in a movement direction. The predetermined turn direction is the turn direction of the lane.

In the case where the lane is curved at a movement-directional forward position, the steering is likely to be performed in the predetermined turn direction, for causing the vehicle to travel along the curve. Therefore, in the above configuration, by the look-ahead compensation process, it is possible to quickly perform the turning of the turning wheel in response to the steering, when the vehicle arrives at the curve.

5. In the traveling environment information acquisition process, the processor of the steering control device according to any one of the items 1 to 4 may acquire information relevant to the curvature radius of a lane on which the vehicle travels, and information relevant to an object near the vehicle. In the look-ahead compensation process, the processor may adopt a turn direction in which the vehicle stays away from the object, as the predetermined turn direction, in a case where the curvature radius is equal to or larger than a threshold and where the object exists.

In the case where the near object exists, the appropriate steering direction is likely to be a steering direction that allows the vehicle to stay away from the near object, from the standpoint of safety. Hence, in the above configuration, the steering shaft is preliminarily rotated in the turn direction in which the vehicle stays away from the near object, and thereby, it is possible to quickly turn the vehicle, when the steering is actually performed such that the vehicle stays away from the near object.

6. The look-ahead compensation process in the steering control device according to the item 5 may include a gradual change process of gradually changing the magnitude of the play compensation amount. In the gradual change process, the processor alters a change speed of the magnitude of the play compensation amount depending on the relative speed of the object to the vehicle, and sets the magnitude of the change speed when the relative speed is high, to equal to or larger than the magnitude of the change speed when the relative speed is low. The relative speed becomes higher as a speed at which the distance between the vehicle and the object is reduced is higher.

When the relative speed is higher, the time for the reduction in the distance between the near object and the own vehicle is shorter than when the relative speed is lower. Hence, in the above configuration, the speed of the change is raised depending on the magnitude of the relative speed. Thereby, it is possible to complete the look-ahead compensation process until the distance to the near object is reduced, regardless of the magnitude of the relative speed.

7. The processor of the steering control device according to any one of the items 1 to 6 may be configured to execute a target rudder angle variable acquisition process, a target rudder angle correction process, and a rudder angle control process. In the target rudder angle variable acquisition process, the processor acquires the value of a target rudder angle variable that indicates a turning angle of the turning wheel. In the target rudder angle correction process, the processor corrects the value of the target rudder angle variable depending on the play compensation amount relevant to the predetermined turn direction. In the rudder angle control process, the processor operates the motor by a control in which a steering angle depending on a rotation angle of the steering shaft is adopted as a control amount and the value of the target rudder angle variable is adopted as a target value of the control amount. The look-ahead compensation process includes the target rudder angle correction process and the rudder angle control process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

A first embodiment will be described below with reference to the drawings.
Base Configuration A steering device 10 shown in FIG. 1 includes a steering wheel 12. A steering shaft 14 is coupled to the steering wheel 12. An end portion of the steering shaft 14 on the opposite side of the steering wheel 12 is coupled to an input shaft of the bevel gear unit 16. An output shaft of the bevel gear unit 16 is coupled to an input shaft of a hydraulic power steering device 20 through a dynamic power transmission shaft 18. A sector shaft of the hydraulic power steering device 20 is coupled to one end portion of a pitman arm 22. The other end portion of the pitman arm 22 is coupled to one end portion of a drag link 24. The other end portion of the drag link 24 is coupled to one end portion of a knuckle arm 26. The other end portion of the knuckle arm 26 is coupled to a kingpin shaft 28 of a right turning wheel 40(R). The kingpin shaft 28 of the right turning wheel 40(R) and a kingpin shaft 28 of a left turning wheel 40(L) are coupled by a tie rod arm 30 and a tie rod 32.

The rotation power of the motor 50 is transmitted to the steering shaft 14. As an example, the motor 50 is a synchronous electric motor. The output voltage of an inverter 52 is applied to a terminal of the motor 50.

Figure 1:
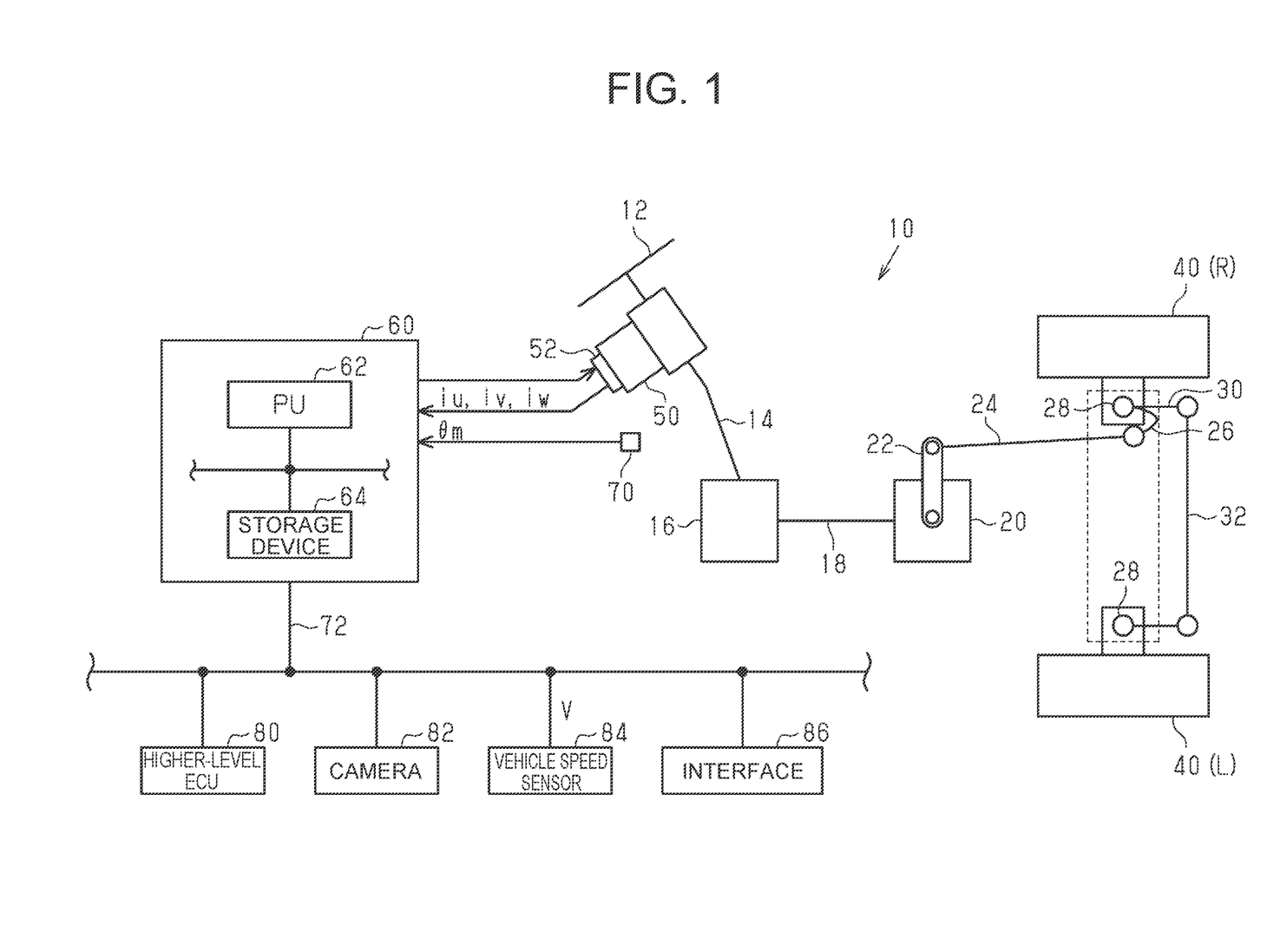
FIG. 1 is a block diagram showing the configuration of a steering system according to a first embodiment.

A steering control device 60 controls the steering device 10 as a control object. For the control of the control object, the steering control device 60 refers to a rotation angle θm of the motor 50 that is detected by a rotation angle sensor 70. Further, the steering control device 60 refers to electric currents iu, iv, iw that flow through respective terminals of the motor 50. For example, the electric currents iu, iv, iw may be detected as voltage drop amounts by shunt resistances provided on respective legs of the inverter 52. The steering control device 60 refers to a vehicle speed V detected by a vehicle speed sensor 84, through a network 72.

The steering control device 60 can communicate with a higher-level ECU 80 through the network 72. The higher-level ECU 80 executes a process of generating a command for intervening in the steering of a vehicle, independently of the instruction of the steering by the operation of the steering wheel 12. In other words, the higher-level ECU 80 executes an automatic steering process. For executing the automatic steering process, the higher-level ECU 80 acquires image data about the periphery of the vehicle that is photographed by a camera 82. Further, the higher-level ECU 80 knows an intention that is input by a driver through an interface 86 and that indicates whether the automatic steering process is executed, and the like.

The steering control device 60 includes a PU 62 and a storage device 64. The PU 62 is a software processing device such as a CPU, a GPU, and a TPU. The storage device 64 may be an electrically non-rewritable non-volatile memory. Further, the storage device 64 may be an electrically rewritable non-volatile memory or a storage medium such as a disk medium. The PU 62 executes a program stored in the storage device 64, so that the steering control device 60 executes the process of controlling the control object.
Characteristic of Steering Device 10

The above-described steering device 10 has a complex link structure, and therefore a so-called play in which the turning wheel 40 does not rotate despite the rotation of the steering shaft 14 is large.

Figure 2:
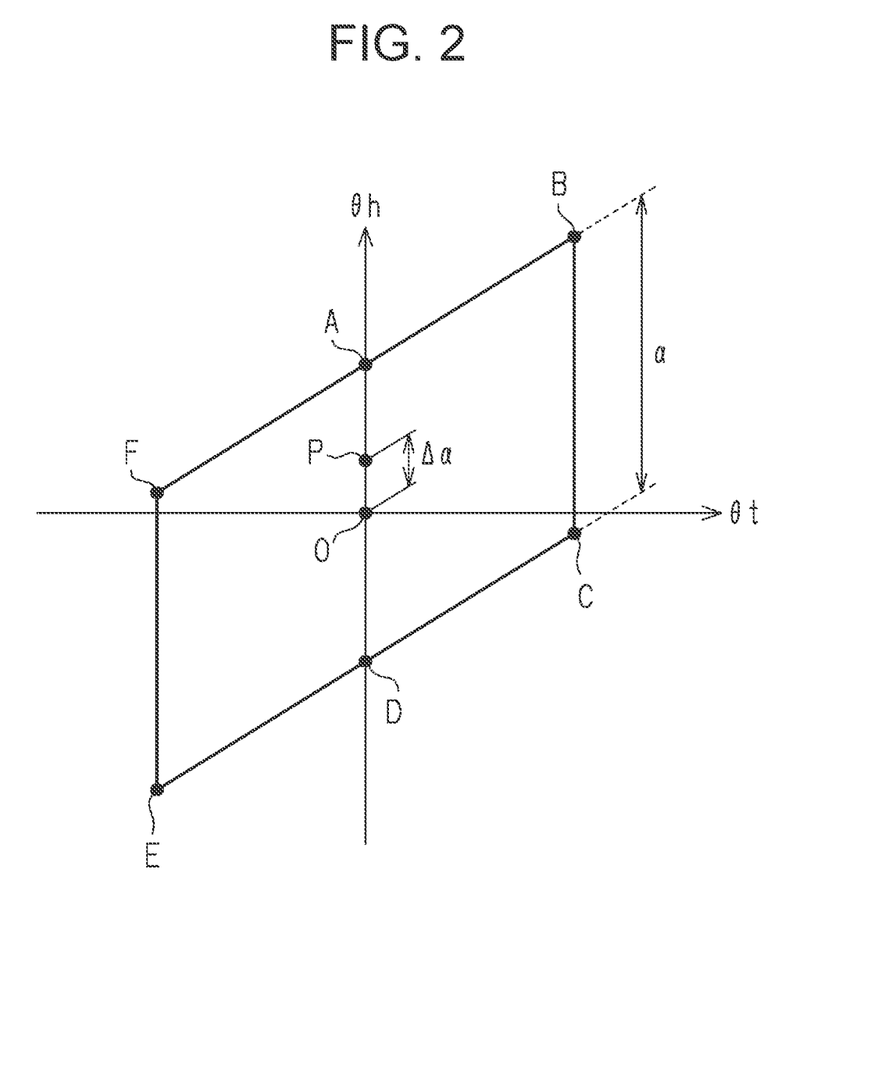
FIG. 2 is a diagram showing the relation between a steering angle and a turning angle according to the first embodiment.

FIG. 2 shows the relation between a steering angle θh and a turning angle θt. The steering angle θh is the rotation angle of the steering shaft 14. On the other hand, the turning angle θt is the moving angle of a tire for the turning wheel 40. Further, a neutral position O described in FIG. 2 is a point where both of the steering angle θh and the turning angle θt are zero. This means that both of the steering angle θh and the turning angle θt indicate a straight-movement direction.

Hereinafter, the rotation angle in the right turn direction is a positive angle, and the rotation angle in the left turn direction is a negative angle.

As shown in FIG. 2, even when the steering angle θh is changed from the neutral position O in the right turn direction, the turning angle θt does not change until the steering angle θh reaches a point A. Then, when the steering angle θh becomes a further large value than the point A, the turning angle θt increases.

Further, even when the steering angle θh is decreased at a point B, the turning angle θt does not change. In other words, even when the steering direction is switched to the left side at the point B, the turning angle θt does not change. The steering direction is a direction that is indicated by the rotation speed of the steering shaft 14. Then, when the steering angle θh becomes a further small value beyond a point C, the turning angle θt decreases. In other words, the steering angle θh is a negative value, and when the absolute value of the steering angle θh is further increased beyond the point C, the turning angle θt decreases.

Then, at a point D where the turning angle θt becomes zero, the steering angle θh becomes a negative value.

A point E is a value that is obtained by further displacing the steering angle θh in the left steering direction after the turning angle θt becomes zero. Even when the steering angle θh is increased at the point E, the turning angle θt does not change until the steering angle θh reaches a point F. When the steering angle θh becomes further large beyond the point F, the turning angle θt increases.

In this way, for example, in the case of the position of the point B, the turning angle θt does not change even when the steering angle θh changes between the point B and the point C. Further, for example, in the case of the position of the point E, the turning angle θt does not change even when the steering angle θh changes between the point E and the point F. In this way, due to the play of the steering device 10, there is a region where the turning angle θt does not change despite the change in the steering angle θh. This region is not a region that includes fixed values of the steering angle θh but a region that can be changed by a history of the change in the steering angle θh.

The displacement of the steering angle θh from the point B to the point C occurs at the time of the switching-back from the right turn. Further, the displacement of the steering angle θh from the point E to the point F occurs at the time of the switching-back from the left turn. The length of the region where the turning angle θt does not change despite the change in the steering angle θh at the time of the switching-back is described as "α" in FIG. 2. Further, "α" is previously stored in the storage device 64. For example, "α" may be a fixed value. Further, for example, "α" may be a value that is often updated. For example, the update process for "α" can be executed as follows.

1. The PU 62 rotates the steering shaft 14 by controlling the rotation angle of the motor 50 at the time of the stop of the vehicle.

2. The PU 62 identifies an end portion of the above region by the rotation angle of the motor 50 immediately before the electric current flowing through the motor 50 by the rotation of the motor 50 exceeds a threshold.

The PU 62 estimates "α" by performing the control of the rotation angle of the motor 50 described in "1" and "2" described above for both of right rotation and left rotation. The PU 62 updates the "α" stored in the storage device 64, by the estimated "α". For example, the PU 62 may store the estimated "α" in the storage device 64. Further, for example, in the storage device 64, the PU 62 may newly store a value resulting from weighted average processing between the estimated "α" and the "α" stored in the storage device 64.

Setting of Play Compensation Amount

The above region causes the decrease in the responsiveness of the change in the turning angle θt with respect to the change in the steering angle θh. Therefore, in the embodiment, the decrease in the responsiveness is restrained by a play compensation amount.

Figure 3:
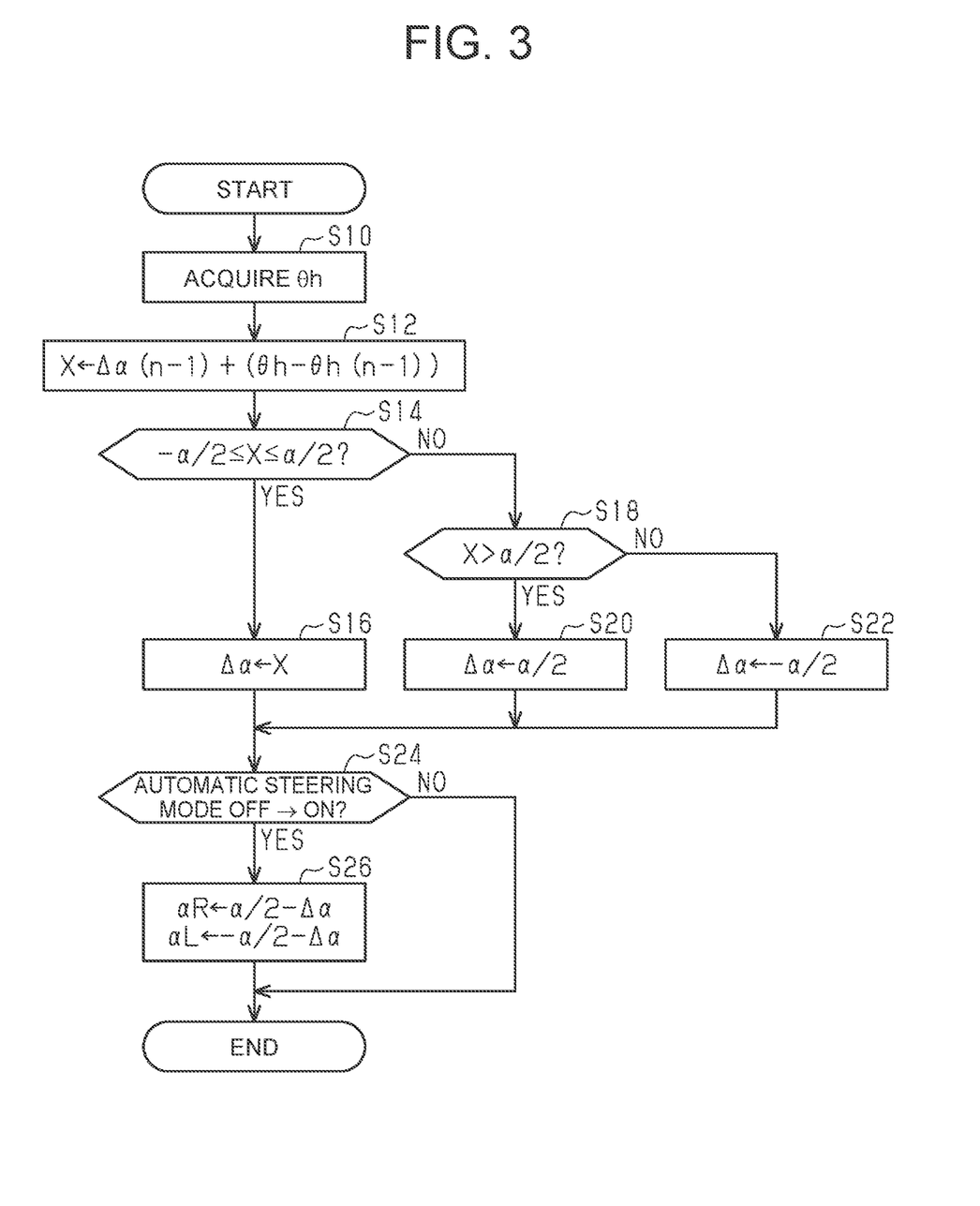
FIG. 3 is a flowchart showing a procedure of a process that is executed by a control device according to the first embodiment.

FIG. 3 shows a procedure of a process relevant to the setting of the play compensation amount. The process shown in FIG. 3 is realized when the PU 62 repeatedly executes a program stored in the storage device 64 with a predetermined period, for example. Hereinafter, step numbers for processes are expressed as numerals in which "S" is put to the head.

In a sequence of processes shown in FIG. 3, the PU 62 acquires the steering angle θh (S10). The steering angle θh is calculated by integration processing of the rotation angle θm, by the PU 62. Next, the PU 62 calculates a variable X for calculating a play displacement, by the following expression (S12).

$$X \leftarrow \Delta\alpha(n-1) + (\theta h - \theta h(n-1))$$

In the above expression, "n−1" means a value at the last execution timing before the execution timing of the sequence of processes shown in FIG. 3. That is, "Δα(n−1)" means a play displacement Δα at the last execution timing of the sequence of processes shown in FIG. 3. Further, "θh(n−1)" means a value acquired in the process of S10 at the last execution timing of the sequence of processes shown in FIG. 3.

FIG. 2 exemplifies the play displacement Δα. FIG. 2 shows a state where the steering angle θh has reached the position of the point P because the steering angle θh has been changed from the neutral position O to the right by the play displacement Δα. Back to FIG. 3, the PU 62 determines whether the value of the variable X is equal to or larger than "−α/2" and is equal to or smaller than "α/2" (S14). In the case where the PU 62 makes the positive determination in the process of S14, the PU 62 substitutes the value of the variable X into the play displacement Δα(S16).

On the other hand, in the case where the PU 62 makes the negative determination in the process of S14, the PU 62 determines whether the value of the variable X is larger than "α/2" (S18). In the case where the PU 62 determines that the value of the variable X is larger than "α/2" (S18: YES), the PU 62 substitutes "α/2" into the play displacement Δα(S20). This process corresponds to a situation in which the steering angle θh has been greatly changed to the right beyond the point A in FIG. 2, for example. In that case, the play displacement Δα is positioned at the end portion in the right steering direction of the region where the turning angle θt does not change despite the change in the steering angle θh. When the length of the region is "α" and the center of the region is defined as "0", the play displacement Δα at the end portion in the right steering direction of the above region is "α/2".

On the other hand, in the case where the PU 62 makes the negative determination in the process of S18, the PU 62 substitutes "−α/2" into the play displacement Δα (S22).

In the case where the PU 62 completes the processes of S16, S20, and S22, the PU 62 determines whether the switching to an automatic steering mode has been performed (S24). The automatic steering mode is a mode in which the above automatic steering process is executed. In the automatic steering mode, the higher-level ECU 80 outputs a target angle θt* to the steering control device 60. The target angle θt* is a variable that indicates the target value of the turning angle of the turning wheel 40. The change amount of the target θt* is quantified so as to be equal to the change amount of the steering angle θh between the point F and the point B or between the point C and the point E shown in FIG. 2.

In the case where the PU 62 determines that the switching has been performed (S24: YES), the PU 62 sets a right play compensation amount αR and a left play compensation amount αL (S26). That is, the PU 62 substitutes "α/2−Δα" into the right play compensation amount αR. Further, the PU 62 substitutes "−α/2−Δα" into the left play compensation amount αL.

For example, in the case where the play displacement Δα is positioned at the point P shown in FIG. 2 at the time when the switching to the automatic steering mode has been performed, the turning angle does not change until the steering angle θh changes by "α/2−Δα", even when the target angle θt* is changed in the right steering direction. Therefore, for enhancing the responsiveness of the turning angle with respect to the change in the target angle θt*, it is desirable to correct the target angle θt* by "α/2−Δα", by an open-loop control, with the change in the target angle θt* in the right steering direction. Therefore, the PU 62 substitutes "α/2−Δα" into the right play compensation amount αR. Further, in the case where the play displacement Δα is positioned at the point P, the turning angle does not change until the steering angle θh changes by "−α/2−Δα", even when the target angle θt* is changed in the left steering direction. Therefore, for enhancing the responsiveness of the turning angle with respect to the change in the target angle θt*, it is desirable to correct the target angle θt* by "−α/2−Δα", by the open-loop control, with the change in the target angle θt* in the left steering direction. Therefore, the PU 62 substitutes "−α/2−Δα" into the left play compensation amount αL.

In the case where the PU 62 completes the process of S26 or makes the negative determination in the process of S24, the PU 62 ends the sequence of processes shown in FIG. 3 once.

Control of Turning Angle in Automatic Steering Mode

Figure 4:
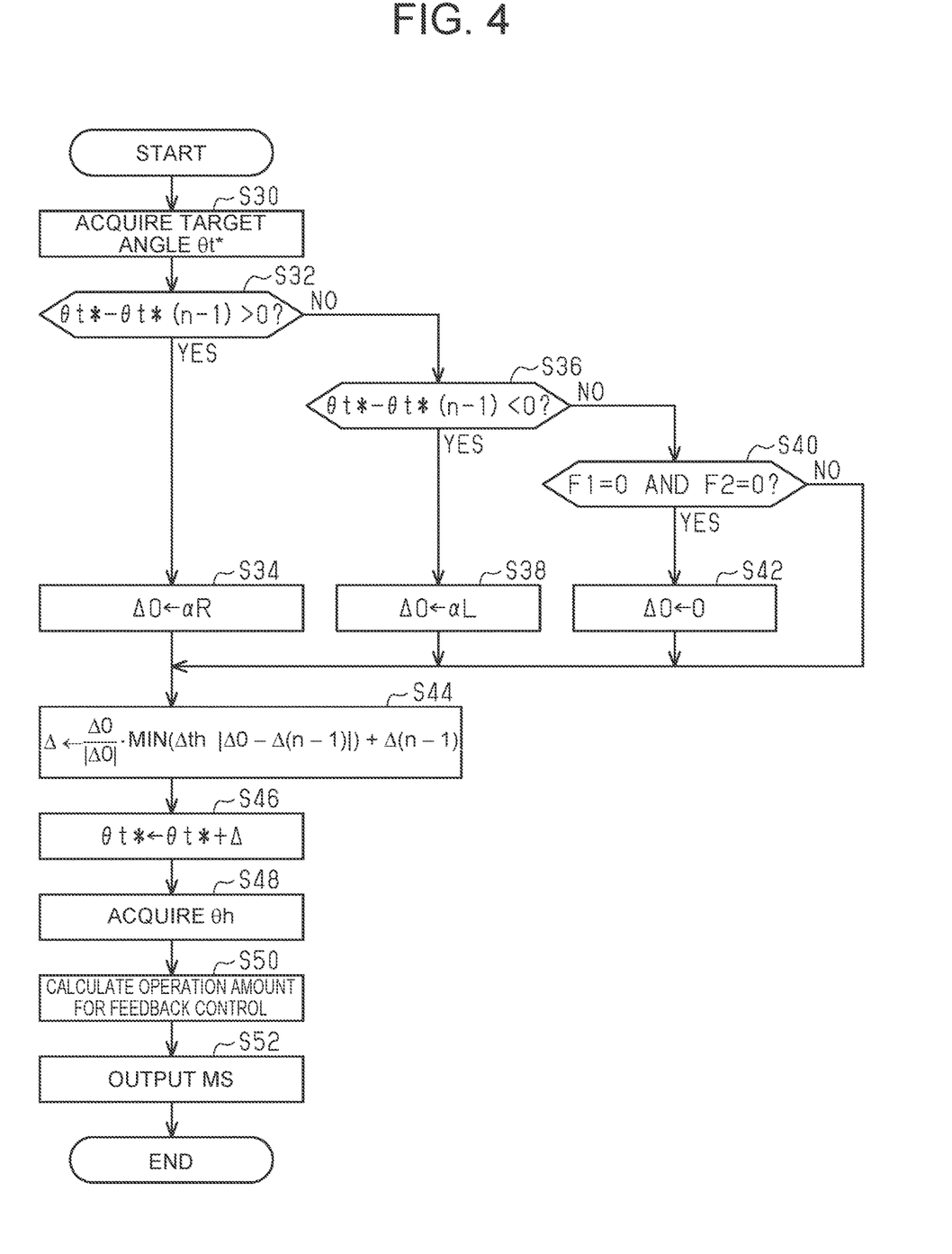
FIG. 4 is a flowchart showing a procedure of a process that is executed by the control device according to the first embodiment.

FIG. 4 shows a procedure of a process relevant to the control of the turning angle. The process shown in FIG. 4 is realized when the PU 62 repeatedly executes a program stored in the storage device 64 with a predetermined period in the automatic steering mode, for example.

In a sequence of processes shown in FIG. 4, first, the PU 62 acquires the target angle θt* that is output by the higher-level ECU 80 (S30). The target angle θt* is a target value of the turning angle of the turning wheel 40. Next, the PU 62 determines whether the change in the target angle θt* is positive (S32). In other words, the PU 62 determines whether the change direction of the target angle θt* is the right steering direction. In the case where the change direction of the target angle θt* is the right steering direction, the instruction from the higher-level ECU 80 through the target angle θt* is the right steering. In FIG. 4, the target angle θt* acquired by the process of S30 at the previous execution timing of the sequence of processes in FIG. 4 is described as "θt*(n−1)".

In the case where the PU 62 determines that the change in the target angle θt* is positive (S32: YES), the PU 62 substitutes the right play compensation amount αR into a play compensation amount Δ0 (S34). On the other hand, in the case where the PU 62 makes the negative determination in the process of S32, the PU 62 determines whether the change in the target angle θt* is negative (S36). In other words, the PU 62 determines whether the change direction of the target angle θt* is the left steering direction. In the case where the PU 62 determines that the change in the target angle θt* is negative (S36: YES), the PU 62 substitutes the left play compensation amount αL into the play compensation amount Δ0 (S38).

In the case where the PU 62 makes the negative determination in the process of S36, the PU 62 determines whether the logical product of a condition that a later-described flag F1 is zero and a condition that a later-described flag F2 is zero is true (S40). In the case where the PU 62 determines that the above logical product is true (S40: YES), the PU 62 substitutes "0" into the play compensation amount Δ0 (S42).

In the case where the PU 62 completes the process of S34, S38, or S42 or makes the negative determination in the process of S40, the PU 62 performs a guard process of restricting the magnitude of the change speed of the play compensation amount Δ0 to a small side (S44). The value after the guard process is a play compensation amount Δ. When the play compensation amount Δ at the last execution timing of the sequence of processes shown in FIG. 4 is "Δ(n−1)", the output of the process of S44 is shown as follows.

$$(\Delta 0/|\Delta 0|) \cdot \mathrm{MIN}(\Delta th, |\Delta 0 - \Delta(n-1)|) + \Delta(n-1)$$

An upper limit Δth specifies the maximum of the magnitude of the change amount of the play compensation amount Δ in the execution period of the processes shown in FIG. 4.

Next, the PU 62 substitutes a value resulting from adding the play compensation amount Δ to the target angle θt*, into the target angle θt* (S46). Next, the PU 62 acquires the steering angle θh (S48). Then, the PU 62 calculates an operation amount for a feedback control in which the steering angle θh is adopted as a control amount and the target angle θt* is adopted as the target variable of the control amount (S50). The operation amount may be the torque of the motor 50. Next, for controlling the motor 50 depending on the operation amount, the PU 62 outputs an operation signal MS to the inverter 52 (S52). Thereby, for example, in the case where the operation amount is the torque of the motor 50, the output voltage of the inverter 52 is operated such that the torque of the motor 50 becomes the operation amount. This process may be executed while the electric currents iu, iv, iw are adopted as inputs, for example.

In the case where the PU 62 completes the process of S52, the PU 62 ends the sequence of processes shown in FIG. 4 once. In a period during which the processes of S30 to S42 are executed, the processes of S44 to S52 may be executed multiple times. In that case, the play compensation amount Δ at the last execution timing of the process of S44 is "Δ(n−1)". Thereby, it is possible to more surely cause the play compensation amount Δ to converge on the play compensation amount Δ0 before the stop of the change in the target angle θt*.

Look-Ahead Compensation Process

The processes of S34 and S38 are process of setting the play compensation amount Δ0 depending on the steering direction. In the embodiment, a look-ahead compensation process of preliminarily setting the play compensation amount Δ0 to the right play compensation amount αR or the left play compensation amount αL depending on traveling information about the vehicle is executed, in addition to the processes of S34 and S38.

Figure 5:
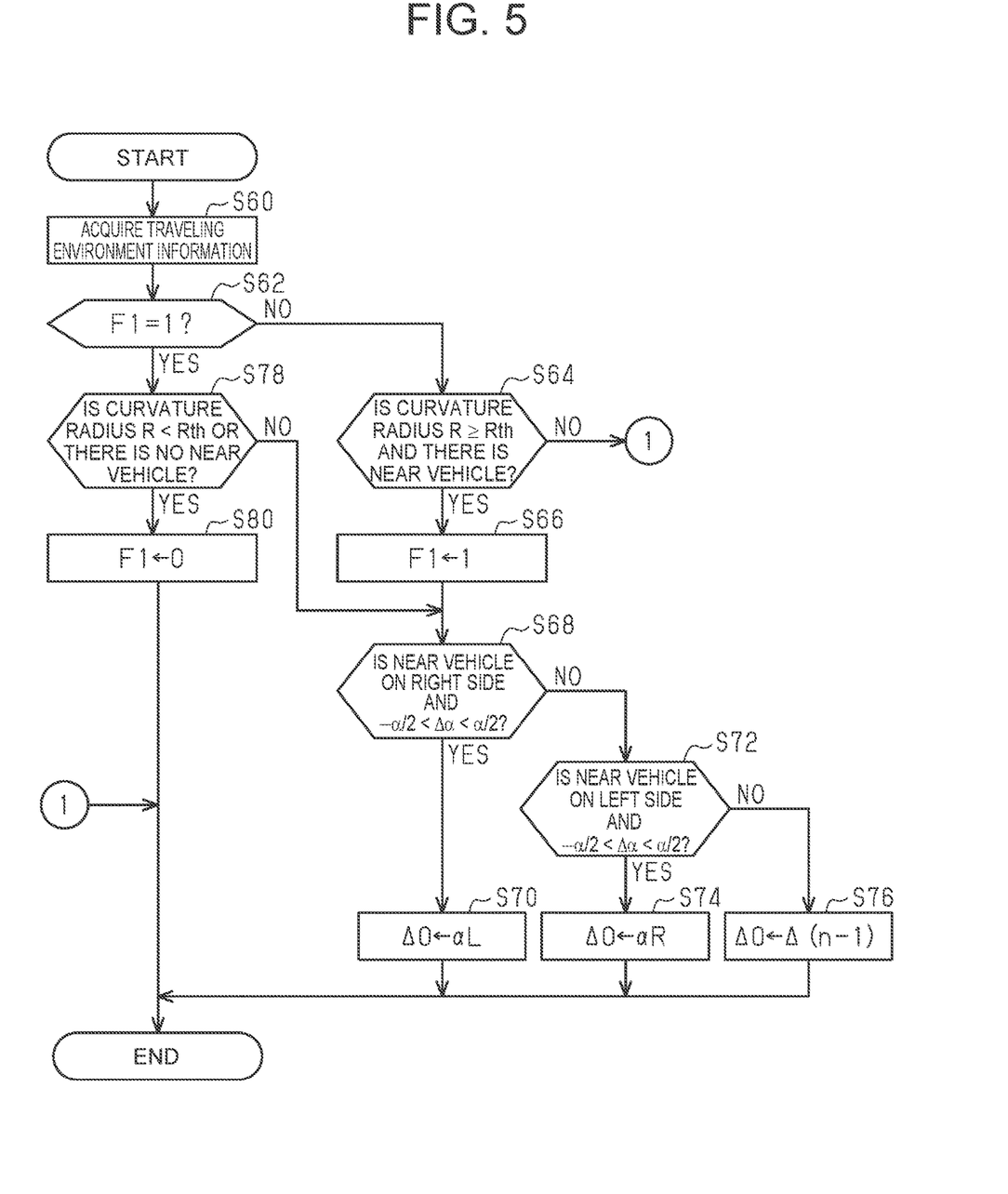
FIG. 5 is a flowchart showing a procedure of a process that is executed by the control device according to the first embodiment.

FIG. 5 shows a process relevant to the look-ahead compensation. The process shown in FIG. 5 is realized when the PU 62 repeatedly executes a program stored in the storage device 64 with a predetermined period, for example.

In a sequence of processes shown in FIG. 5, first, the PU 62 acquires traveling environment information about the vehicle, by the communication with the higher-level ECU 80 (S60). The traveling environment information includes information relevant to the curvature of a lane on which the vehicle travels. For example, the higher-level ECU 80 analyzes the image captured by the camera 82, and thereby the information relevant to the curvature is generated. Further, the traveling environment information includes information relevant to a vehicle that travels on a lane adjacent to the lane that the own vehicle travels. For example, the higher-level ECU 80 analyzes the image captured by the camera 82, and thereby the information relevant to the vehicle that travels on the adjacent lane is generated.

Next, the PU 62 determines whether the flag F1 is "1" (S62). In the case where a process of setting the play compensation amount Δ0 depending on the existence of a near vehicle is being executed, the flag F1 is "1". In the case where the process of setting the play compensation amount Δ0 depending on the existence of the near vehicle is not being executed, the flag F1 is "0".

In the case where the PU 62 determines that the flag F1 is "0" (S62: NO), the PU 62 determines whether the logical product of the following condition (A) and condition (B) is true (S64).

Condition (A) is a condition that a curvature radius R of the lane on which the vehicle travels is equal to or larger than a threshold Rth. The threshold Rth is set based on a lower limit that allows the lane to be regarded as a straight route.

Condition (B) is a condition that a vehicle travels on the adjacent lane within a predetermined distance from the own vehicle.

In the case where the PU 62 determines that the logical product of condition (A) and condition (B) is true (S64: YES), the PU 62 substitutes "1" into the flag F1 (S66). Then, the PU 62 determines whether the logical product of the following condition (C) and condition (D) is true (S68).

Condition (C) is a condition that the near vehicle travels on a lane on the right side of the lane on which the own vehicle travels.

Condition (D) is a condition that the play displacement Δα is larger than "−α/2" and is smaller than "α/2". This condition is a condition indicating a situation where the turning angle θt is not displaced immediately even when the steering angle θ is changed.

In the case where the PU 62 determines that the logical product of condition (C) and condition (D) is true (S68: YES), the PU 62 substitutes the left play compensation amount αL into the play compensation amount Δ0 (S70).

On the other hand, in the case where the PU 62 determines that the logical product of condition (C) and condition (D) is false (S68: NO), the PU 62 determines whether the logical product of the following condition (E) and condition (D) is true (S72).

Condition (E) is a condition that the near vehicle travels on a lane on the left side of the lane on which the own vehicle travels.

In the case where the PU 62 determines that the logical product of condition (E) and condition (D) is true (S72: YES), the PU 62 substitutes the right play compensation amount αR into the play compensation amount Δ0 (S74).

On the other hand, in the case where the PU 62 determines that the logical product of condition (E) and condition (D) is false (S72: NO), the PU 62 substitutes "Δ (n−1)" into the play compensation amount Δ0 (S76).

On the other hand, in the case where the PU 62 determines that the flag F1 is "1" (S62: YES), the PU 62 determines whether the logical sum of the following condition (F) and condition (G) is true (S78).

Condition (F) is a condition that the curvature radius R of the lane on which the own vehicle travels is smaller than the threshold Rth.

Condition (G) is a condition that no vehicle exists within the predetermined distance from the own vehicle on the lane adjacent to the lane on which the own vehicle travels.

In the case where the PU 62 determines that the logical sum of condition (F) and condition (G) is false (S78: NO), the PU 62 transitions to the process of S68. On the other hand, in the case where the PU 62 determines that the logical sum of condition (F) and condition (G) is true (S78: YES), the PU 62 substitutes "0" into the flag F1 (S80).

Figure 6:
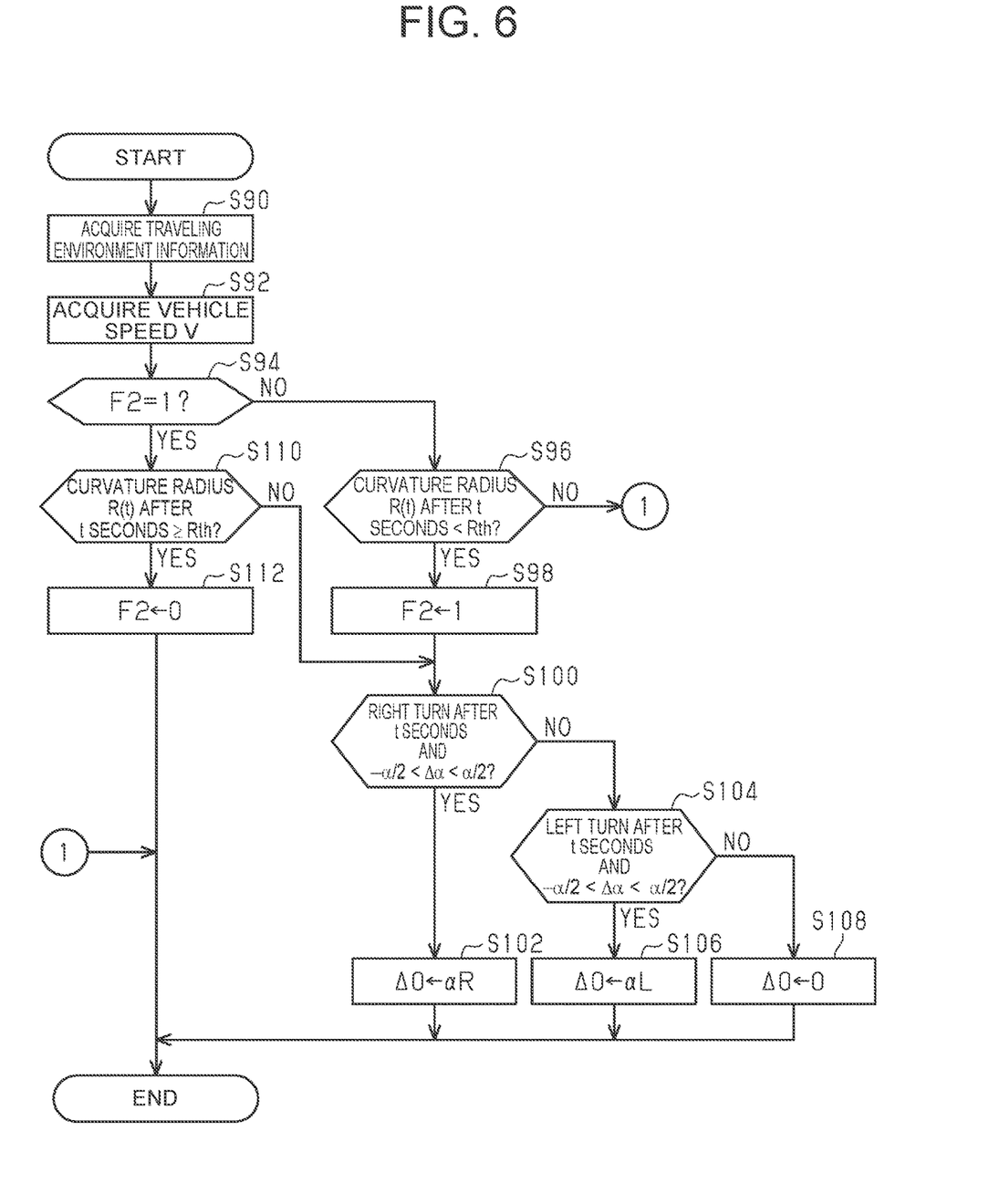
FIG. 6 is a flowchart showing a procedure of a process that is executed by the control device according to the first embodiment.

In the case where the PU 62 completes the process of S70, S74, S76, or S80 or makes the negative determination in the process of S64, the PU 62 ends the sequence of processes shown in FIG. 5 once. FIG. 6 shows a procedure of another process relevant to the look-ahead compensation. The process shown in FIG. 6 is realized when the PU 62 repeatedly executes a program stored in the storage device 64 with a predetermined period, for example.

In a sequence of processes shown in FIG. 6, first, the PU 62 acquires traveling environment information about the vehicle, by the communication with the higher-level ECU 80 (S90). The traveling environment information includes the information relevant to the curvature of the lane on which the vehicle travels. For example, the higher-level ECU 80 analyzes the image captured by the camera 82, and thereby the information relevant to the curvature is generated. Next, the PU 62 acquires the vehicle speed V (S92).

Next, the PU 62 determines whether the flag F2 is "1" (S94). In the case where a process of setting the play compensation amount Δ0 depending on the curve of the lane is being executed, the flag F2 is "1". In the case where the process of setting the play compensation amount Δ0 depending on the curve of the lane is not being executed, the flag F2 is "0".

In the case where the PU 62 determines that the flag F2 is "0" (S94: NO), the PU 62 determines whether a curvature radius R(t) after t seconds is smaller than the threshold Rth (S96). The curvature radius R(t) after t seconds is calculated by the PU 62, depending on traveling environment information acquired in S90 and the arrival position of the vehicle after t seconds that is calculated depending on the vehicle speed V. In the case where the PU 62 determines that the curvature radius R(t) after t seconds is smaller than the threshold Rth (S96: YES), the PU 62 substitutes "1" into the flag F2 (S98). Next, the PU 62 determines whether the logical product of the following condition (H) and the above condition (D) is true (S100).

Condition (H) is a condition that the lane after t seconds is a right turn curve. In the case where the PU 62 determines that the logical product of condition (H) and condition (D) is true (S100: YES), the PU 62 substitutes the right play compensation amount αR into the play compensation amount Δ0 (S102).

On the other hand, in the case where the PU 62 determines that the logical product of condition (H) and condition (D) is false (S100: NO), the PU 62 determines whether the logical product of the following condition (I) and condition (D) is true (S104).

Condition (I) is a condition that the lane after t seconds is a left turn curve. In the case where the PU 62 determines that the logical product of condition (I) and condition (D) is true (S104: YES), the PU 62 substitutes the left play compensation amount αL into the play compensation amount Δ0 (S106).

On the other hand, in the case where the PU 62 determines that the logical product of condition (I) and condition (D) is false (S104: NO), the PU 62 substitutes "0" into the play compensation amount Δ0 (S108). This process is equivalent to the process of S76.

On the other hand, in the case where the PU 62 determines that the flag F2 is "1" (S94: YES), the PU 62 determines whether the curvature radius R(t) after t seconds is equal to or larger than the threshold Rth (S110). In the case where the PU 62 determines that the curvature radius R(t) after t seconds is smaller than the threshold Rth (S110: NO), the PU 62 transitions to the process of S100. On the other hand, in the case where the PU 62 determines that the curvature radius R(t) after t seconds is equal to or larger than the threshold Rth (S110: YES), the PU 62 substitutes "0" into the flag F2 (S112).

In the case where the PU 62 competes the process of S102, S106, S108, or S112 or makes the negative determination in the process of S96, the PU 62 ends the sequence of processes shown in FIG. 6 once.

Operation and Effect of Embodiment

Figure 7:
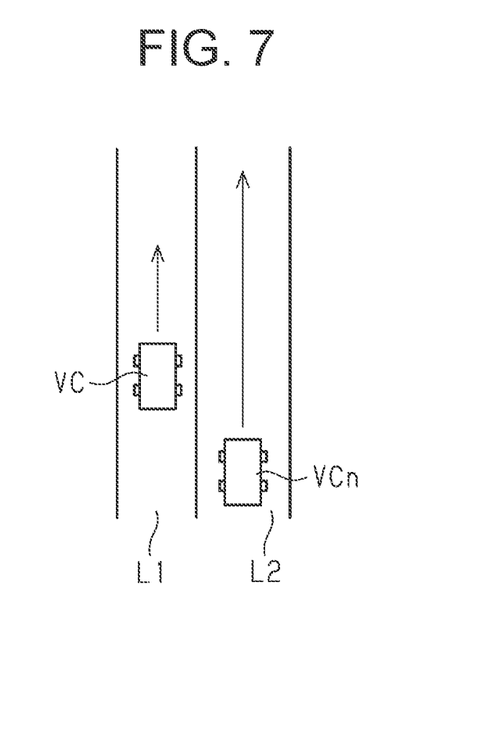
FIG. 7 is a diagram exemplifying a situation where a look-ahead compensation process according to the first embodiment is executed.

FIG. 7 shows a case where a vehicle VCn travels on a right-side lane L2 adjacent to a lane L1 on which an own vehicle VC travels. In the case where the distance between the own vehicle VC and the vehicle VCn is within the predetermined distance, the PU 62 determines whether the target angle θt* does not change and the play displacement Δα is larger than "−α/2" and is smaller than "α/2". In the case where the target angle θt* does not change and the play displacement Δα is larger than "−α/2" and is smaller than "α/2", the PU 62 executes the look-ahead compensation process of substituting the left play compensation amount αL into the play compensation amount Δ0.

That is, in a situation before the look-ahead compensation process, the turning angle θt does not change immediately even when the steering angle θh is changed. Meanwhile, the vehicle VCn travels on the lane on the right side, and therefore depending on the behavior of the vehicle VCn, there is a possibility that the own vehicle VC is desired to quickly perform the steering in the left direction. Hence, the PU 62 substitutes the left play compensation amount αL into the play compensation amount Δ0. Thereby, the own vehicle VC can quickly approach the left side, depending on the behavior of the vehicle VCn.

Figure 8:
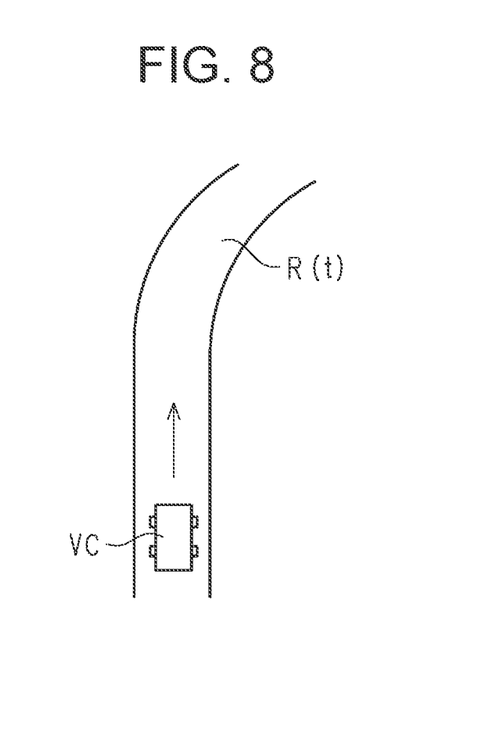
FIG. 8 is a diagram exemplifying a situation where the look-ahead compensation process according to the first embodiment is executed.

FIG. 8 shows a case where the lane on which the own vehicle VC travels is curved to the right side at the arrival position after t seconds. The PU 62 determines whether the target angle θt* does not change and the play displacement Δα is larger than "−α/2" and is smaller than "α/2". In the case where the target angle θt* does not change and the play displacement Δα is larger than "−α/2" and is smaller than "α/2", the PU 62 executes the look-ahead compensation process of substituting the right play compensation amount αR into the play compensation amount Δ0.

That is, in a situation before the look-ahead compensation process, the turning angle θt does not change immediately even when the steering angle θh is changed. Meanwhile, the lane is curved to the right side at the arrival position after t seconds, and therefore, there is a possibility that the own vehicle VC is desired to quickly perform the steering in the right direction, after t seconds. Hence, the PU 62 substitutes the right play compensation amount αR into the play compensation amount Δ0. Thereby, the own vehicle VC is prepared to quickly turn to the right side.

Second Embodiment

For a second embodiment, differences from the first embodiment will be mainly described below with reference to the drawings.

Figure 9:
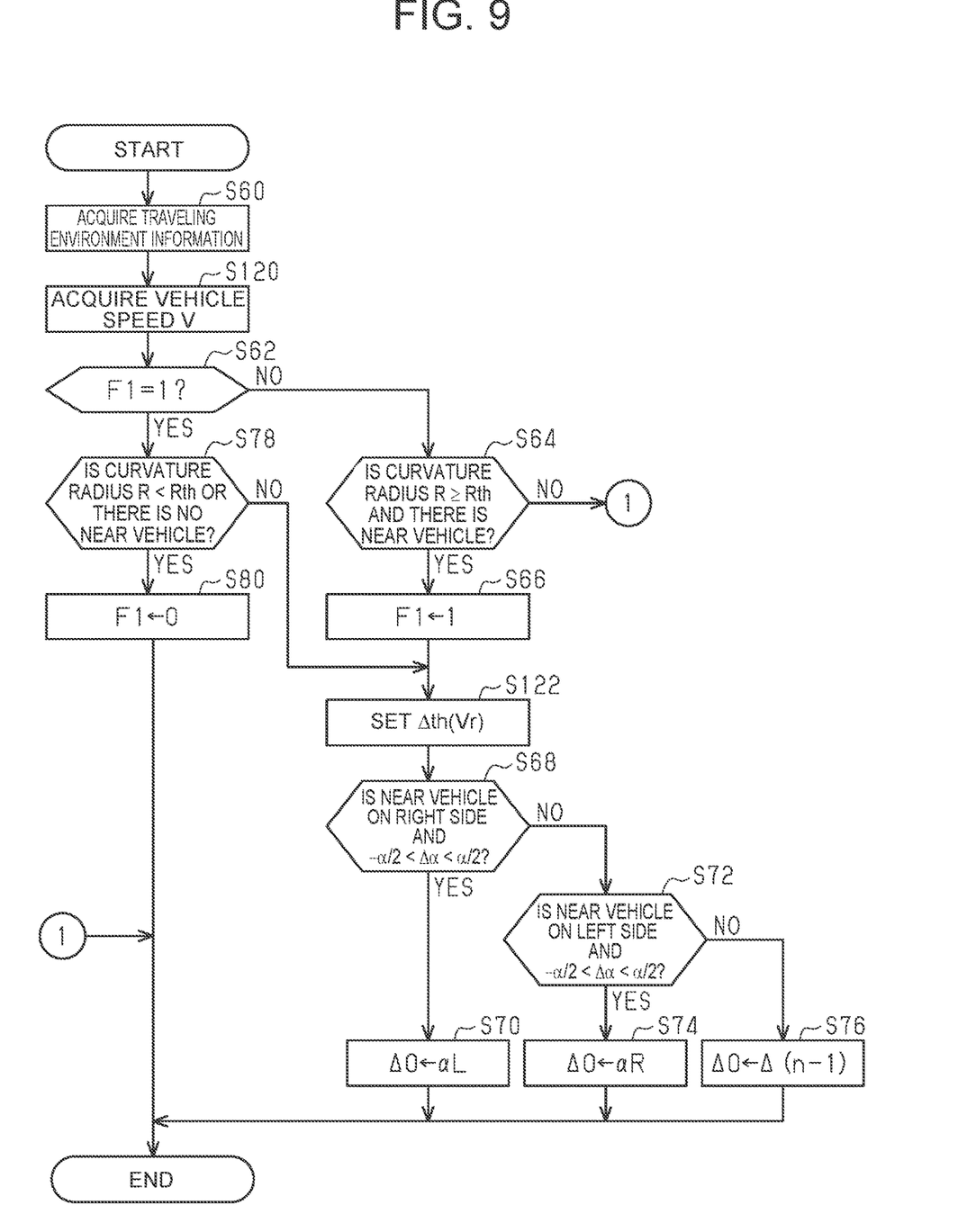
FIG. 9 is a flowchart showing a procedure of a process that is executed by a control device according to a second embodiment.

In the embodiment, the change speed of the play compensation amount Δ in the look-ahead compensation is altered depending on the situation. FIG. 9 shows a procedure of a process relevant to a look-ahead compensation according to the embodiment. The process shown in FIG. 9 is realized when the PU 62 repeatedly executes a program stored in the storage device 64 with a predetermined period, for example. In FIG. 9, for convenience, identical step numbers are given to processes corresponding to processes shown in FIG. 5.

In a sequence of processes shown in FIG. 9, the PU 62 acquires the vehicle speed V, in addition to the process of S60 (S120). In the case where the PU 62 completes the process of S66 and makes the negative determination in the process of S78, the PU 62 sets the upper limit Δth depending on a relative vehicle speed Vr of the near vehicle to the own vehicle (S122). The relative vehicle speed Vr is calculated by the PU 62, depending on information that is relevant to the vehicle speed of the near vehicle and that is included in the traveling environment information acquired by the process of S60, and the vehicle speed V. The relative vehicle speed Vr is defined to be positive in the case where the near vehicle gets close to the own vehicle. The PU 62 sets the upper limit Δth such that the upper limit Δth when the relative vehicle speed Vr is high is equal to or higher than the upper limit Δth when the relative vehicle speed Vr is low. This process may be a process of performing map computation of the upper limit Δth by the PU 62 in a state where map data is stored in the storage device 64. The map data is data in which the relative vehicle speed Vr is adopted as an input variable and the upper limit Δth is adopted as an output variable.

The map data is combination data of discrete values of the input variable and values of the output variable that respectively correspond to the values of the input variable. Further, in the map computation, in the case where the value of the input variable coincides with one of the values of the input variable in the map data, a corresponding value of the output variable in the map data may be adopted as the computation result. Further, in the map computation, in the case where the value of the input variable does not coincide with any of the values of the input variable in the map data, a value obtained by the interpolation with a plurality of values of the output variable included in the map data may be adopted as the computation result. Instead of this, in the map computation, in the case where the value of the input variable does not coincide with any of the values of the input variable in the map data, a value of the output variable in the map data that corresponds to a closest value of the plurality of values of the input variable included in the map data may be adopted as the computation result.

The output variable of the map data includes values different from each other. The process of S122 is a process for increasing the change speed of the play compensation amount Δ when the relative vehicle speed Vr is high. Thereby, it is possible to complete the change in the play compensation amount Δ before the near vehicle arrives at a side of the own vehicle.

In the case where the PU 62 completes the process of S122, the PU 62 transitions to the process of S68.

Correspondence Relation

The correspondence relation between the matters in the above embodiments and the items described in "SUMMARY" is shown as follows. The correspondence relation will be shown below for each of the numbers of the items described in "SUMMARY".

(1) The traveling environment information acquisition process corresponds to the processes of S60 and S90. The look-ahead compensation process corresponds to the processes of S70, S74, S102, and S106. The predetermined turn direction corresponds to the turn direction in which the vehicle stays away from the near vehicle in the processes in FIG. 5 and FIG. 9. The predetermined turn direction corresponds to the turn direction of the lane at the movement-directional forward position in the process in FIG. 6.

(2)-(3) The play displacement calculation process corresponds to the processes of S12 to S22.

(4) The process corresponds to FIG. 6.

(5) The process corresponds to FIG. 5. The object corresponds to the near vehicle VCn.

(6) The gradual change process corresponds to the processes of S44 and S122.

(7) The target rudder angle variable acquisition process corresponds to the process of S30. The target rudder angle correction process corresponds to the process of S46. The rudder angle control process corresponds to the processes of S50 and S52.

OTHER EMBODIMENTS

The embodiments can be carried out while being modified as follows. The embodiments and the following modifications can be carried out while being combined with each other, as long as there is no technical inconsistency.

Look-Ahead Compensation Process

In the process of S68 shown in FIG. 5 and FIG. 9, condition (D) may be excluded. In the process of S72 shown in FIG. 5 and FIG. 9, condition (D) may be excluded.

In the process of S70 shown in FIG. 5 and FIG. 9, the play compensation amount $\Delta 0$ does not need to be set to the left play compensation amount $\alpha L$. For example, it is allowable to adopt a process of substituting the smaller value of a value resulting from adding a predetermined amount to the last play compensation amount $\Delta(n-1)$ and the left play compensation amount $\alpha L$, into the play compensation amount $\Delta 0$.

In the process of S74 shown in FIG. 5 and FIG. 9, the play compensation amount $\Delta 0$ does not need to be set to the right play compensation amount $\alpha R$. For example, it is allowable to adopt a process of substituting the larger value of a value resulting from subtracting a predetermined amount from the last play compensation amount $\Delta(n-1)$ and the right play compensation amount $\alpha R$, into the play compensation amount $\Delta 0$.

In the process of S100 shown in FIG. 6, condition (D) may be excluded.

In the process of S104 shown in FIG. 6, condition (D) may be excluded.

In the process of S102 shown in FIG. 6, the play compensation amount $\Delta 0$ does not need to be set to the right play compensation amount $\alpha R$. For example, it is allowable to adopt a process of substituting the smaller value of a value resulting from adding a predetermined amount to the last play compensation amount $\Delta(n-1)$ and the right play compensation amount $\alpha R$, into the play compensation amount $\Delta 0$.

In the process of S106 shown in FIG. 6, the play compensation amount $\Delta 0$ does not need to be set to the left play compensation amount $\alpha L$. For example, it is allowable to adopt a process of substituting the larger value of a value resulting from subtracting a predetermined amount from the last play compensation amount $\Delta(n-1)$ and the left play compensation amount $\alpha L$, into the play compensation amount $\Delta 0$.

The look-ahead compensation process does not need to include both of the process exemplified in FIG. 5 or FIG. 9 and the process exemplified in FIG. 6. For example, it is allowable to adopt a configuration in which the process exemplified in FIG. 6 is executed and the process exemplified in FIG. 5 or FIG. 9 is not executed.

In the process exemplified in FIG. 5 or FIG. 9, the near vehicle may be replaced with a near object.

The information that is relevant to the traveling environment of the vehicle and that is the input for the look-ahead compensation process is not limited to the information exemplified in the above embodiments. For example, it is allowable to adopt information indicating that there is a cliff on a side of the lane on which the vehicle travels. In that case, a steering direction that allows the vehicle to stay away from the cliff may be adopted as the predetermined turn direction, and the steering shaft 14 may be preliminarily rotated by the play compensation amount corresponding to the predetermined turn direction.

The look-ahead compensation process is not limited to the process that is executed during the execution of the automatic steering process. For example, the look-ahead compensation process may be executed when the driver is operating the steering wheel 12. In that case, for example, when the look-ahead compensation process is executed only in a situation where condition (D) is satisfied, it is possible to restrain the driver from having a feeling of strangeness.

Gradual Change Process

For example, in the case where the play compensation amount $\Delta$ does not reach the play compensation amount $\Delta 0$ at the time when the change in the target angle $\theta t^*$ is stopped, the play compensation amount $\Delta$ may be changed until the play compensation amount $\Delta$ reaches the play compensation amount $\Delta 0$. This means that the play compensation amount $\Delta$ is changed to the right play compensation amount $\alpha R$ in the case where the target angle $\theta t^*$ transitions from the state of the change in the right steering direction to the state of the stop of the change, for example.

In the process in FIG. 6, a process of setting the upper limit $\Delta th$ between S98 and S100 may be executed. In that case, the PU 62 may alter the upper limit $\Delta th$ depending on the vehicle speed V. Specifically, the PU 62 sets the upper limit $\Delta th$ such that the upper limit $\Delta th$ when the vehicle speed V is high is equal to or larger than the upper limit $\Delta th$ when the vehicle speed V is low.

The execution of the gradual change process is not essential. That is, the play compensation amount $\Delta$ may constantly coincide with the play compensation amount $\Delta 0$.

Automatic Steering Mode

In the above embodiments, a process in which the higher-level ECU 80 executes the steering in a state where the steering wheel 12 is not operated by the driver is assumed. However, the automatic steering process that is executed in the automatic steering mode is not limited to such a process. For example, the automatic steering process that is executed in the automatic steering mode may be a process in which the higher-level ECU 80 intervenes in the steering in the case where the vehicle is about to depart from the lane when the driver is operating the steering wheel 12. Further, for example, the automatic steering process that is executed in the automatic steering mode may be a process in which the higher-level ECU 80 intervenes in the steering in the case where the vehicle is about to make contact with an obstacle when the driver is operating the steering wheel 12.

Rudder Angle Control Process

The rudder angle control process does not need to include the process of calculating the operation amount for the feedback control in which the steering angle θth is adopted as the control amount and the target angle θt* is adopted as the target value of the control amount. For example, a process of calculating an operation amount for an open-loop control in which the steering angle θh is adopted as a control amount and the target angle θt* is adopted as the target value of the control amount may be included. Further, for example, a process of calculating both of the operation amount for the feedback control and the operation amount for the open-loop control may be included.

Steering Control Device

The steering control device is not limited to the device that acquires the target angle θt* set by the higher-level ECU 80. For example, a device in which the steering control device 60 and the higher-level ECU 80 are integrated may be adopted.

The steering control device 60 is not limited to the device that includes the PU 62 and the storage device 64 and that executes software processing. For example, at least some of the processes that are executed by software processing in the above embodiments may be executed by a dedicated hardware circuit (for example, an ASIC) that performs hardware processing. That is, the steering control device may have one configuration of the following (a) to (c).

(a) A processing device that executes all of the above processes in accordance with programs and a program storage device that stores the programs, as exemplified by a ROM, are included.

(b) A processing device that executes some of the above processes in accordance with programs, a program storage device, and a dedicated hardware circuit that executes the remaining processes are included.

(c) A dedicated hardware circuit that executes all of the above processes is included. A plurality of software processing circuits each of which includes a processing device and a program storage device, or a plurality of dedicated hardware circuits may be provided. That is, the above process may be executed by a processing circuit that includes at least one of a single or a plurality of software processing circuits and a single or a plurality of dedicated hardware circuits.

What is claimed is:

1. A steering control device configured to control a steering device that includes a steering shaft, a turning wheel of a vehicle, the turning wheel turning due to rotation of the steering shaft, and a motor rotating the steering shaft,
    the steering control device comprising a processor configured to execute a traveling environment information acquisition process and a look-ahead compensation process, wherein:
    in the traveling environment information acquisition process, the processor acquires information relevant to a traveling environment of the vehicle;
    in the look-ahead compensation process, the processor preliminarily rotates the steering shaft depending on a play compensation amount relevant to a predetermined turn direction; and
    the processor determines an appropriate turn direction for the vehicle, as the predetermined turn direction, from the information relevant to the traveling environment, wherein:
    the processor is configured to execute a target rudder angle variable acquisition process, a target rudder angle correction process, and a rudder angle control process,
    in the target rudder angle variable acquisition process, the processor acquires a value of a target rudder angle variable that indicates a turning angle of the turning wheel,
    in the target rudder angle correction process, the processor corrects the value of the target rudder angle variable depending on the play compensation amount relevant to the predetermined turn direction,
    in the rudder angle control process, the processor operates the motor by a control in which a steering angle depending on a rotation angle of the steering shaft is adopted as a control amount and the value of the target rudder angle variable is adopted as a target value of the control amount, and
    the look-ahead compensation process includes (a) the target rudder angle correction process correcting, depending on the play compensation amount relevant to the predetermined turn direction, the value of the target rudder angle variable when the uncorrected target rudder angle variable does not change, and (b) the rudder angle control process.

2. The steering control device according to claim 1, wherein:
    the processor is configured to execute a play displacement calculation process in which the processor calculates a play displacement whenever a steering angle changes;
    the steering angle is a rotation angle of the steering shaft;
    the play displacement identifies a position in a region where a turning angle of the turning wheel does not change despite change in the steering angle; and
    the play compensation amount relevant to the predetermined turn direction allows the play displacement to be maintained within the region.

3. The steering control device according to claim 2, wherein the play compensation amount relevant to the predetermined turn direction allows the play displacement to be set to an end portion of the region in the predetermined turn direction.

4. The steering control device according to claim 1, wherein:
    in the traveling environment information acquisition process, the processor acquires information relevant to a turn direction of a lane at a predetermined spot located forward of the vehicle in a movement direction; and
    the predetermined turn direction is the turn direction of the lane.

5. The steering control device according to claim 1, wherein:
    in the traveling environment information acquisition process, the processor acquires information relevant to a curvature radius of a lane on which the vehicle travels, and information relevant to an object near the vehicle; and
    in the look-ahead compensation process, the processor adopts a turn direction in which the vehicle stays away from the object, as the predetermined turn direction, in a case where the curvature radius is equal to or larger than a threshold and where the object exists.

6. The steering control device according to claim 5, wherein:
the look-ahead compensation process includes a gradual change process of gradually changing a magnitude of the play compensation amount;
in the gradual change process, the processor alters a change speed of the magnitude of the play compensation amount depending on a relative speed of the object to the vehicle, and sets a magnitude of the change speed when the relative speed is high, to equal to or larger than a magnitude of the change speed when the relative speed is low; and
the relative speed becomes higher as a speed at which a distance between the vehicle and the object is reduced is higher.

* * * * *